United States Patent

Guarino et al.

[15] 3,635,807
[45] Jan. 18, 1972

[54] PHOTOLYTIC PRODUCTION OF KETOXIMES

[72] Inventors: John P. Guarino, Trenton; Robert H. Williams, Pennington, both of N.J.

[73] Assignee: Mobil Oil Corporation

[22] Filed: Jan. 13, 1969

[21] Appl. No.: 790,837

Related U.S. Application Data

[63] Continuation-in-part of Ser. No. 718,365, Apr. 3, 1968, Pat. No. 3,459,648, which is a continuation-in-part of Ser. No. 569,107, Aug. 1, 1966, abandoned.

[52] U.S. Cl. .................................................204/162, 260/647
[51] Int. Cl. ...................................................B01j 1/10, C07c 81/06
[58] Field of Search.....................204/162, 162 OX; 260/647

[56] References Cited

UNITED STATES PATENTS

| | | | |
|---|---|---|---|
| 3,047,482 | 7/1962 | Cheng et al. | 204/162 |
| 3,048,634 | 8/1962 | Mueller et al. | 204/162 OX X |
| 3,141,839 | 7/1964 | Metzger et al. | 204/162 |

*Primary Examiner*—Benjamin R. Padgett
*Attorney*—Oswald G. Hayes, Andrew L. Gaboriault and Hastings S. Trigg

[57] ABSTRACT

Cycloaliphatic ketoximes are produced in good yields by means of a photochemical reaction between a cycloaliphatic compound and an alkyl nitrite in the presence of an alkyl alcohol and ammonia.

16 Claims, No Drawings

PHOTOLYTIC PRODUCTION OF KETOXIMES

CROSS-REFERENCES TO RELATED APPLICATIONS

This application is a continuation-in-part of copending application Ser. No. 718,365, now U.S. Pat. No. 3,459,648, filed Apr. 3, 1968, which in turn is a continuation-in-part of Ser. No. 569,107, now abandoned, filed Aug. 1, 1966.

BACKGROUND OF THE INVENTION (1) The field of the invention is the photolytic synthesis of cycloaliphatic ketoximes. (2) It has been proposed to prepare cyclic ketoximes by reacting nitrosyl chloride with a cycloalkane in the presence of actinic light or ionizing radiation. It has also been proposed to react a cycloalkane with nitric oxide in the presence of gamma radiation. In another pending application Ser. No. 542,719, there is disclosed and claimed a process of forming a ketoxime by reacting a cycloaliphatic compound with an alkyl nitrite while irradiating the reactants with ionizing radiation; in said application Ser. No. 569,107, the last-mentioned reaction is carried out photolytically instead of with ionizing radiation; and in said application Ser. No. 718,365, the reaction is also carried out photolytically but in the presence of a polar compound.

SUMMARY OF THE INVENTION

The invention comprises preparing cycloaliphatic ketoximes by photolytically reacting a cycloaliphatic compound with an alkyl nitrite in the presence of an alkyl alcohol and ammonia. Preferably the alkyl nitrite is prepared in situ from the alkyl alcohol and nitrogen dioxide ($NO_2$ and $N_2O_4$), and according to this procedure, a starting mixture prepared from cycloaliphatic compound, alkyl, alcohol, nitrogen dioxide, and ammonia is formed and subjected to photolysis, there being formed a nitrosocycloaliphatic compound which then rearranges to give the corresponding oxime. The alkyl alcohol and the ammonia undergo chemical reactions, as will be described, but according to the invention, they are used in excess, and are present during the rearrangement reaction, upon which they have an influence.

DESCRIPTION OF THE SPECIFIC EMBODIMENTS

It may be noted that cyclohexanone oxime, a preferred product, is of value as an intermediate for making nylon 6, being convertible by the Beckmann rearrangement to epsilon caprolactam, and the latter by self-condensation yields nylon 6.

The following equations, in which cyclohexane and t-butyl alcohol are used to illustrate the cycloaliphatic compound and the alkyl alcohol, may help demonstrate the preparation method:

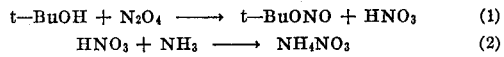
$$t\text{—BuOH} + N_2O_4 \longrightarrow t\text{—BuONO} + HNO_3 \quad (1)$$
$$HNO_3 + NH_3 \longrightarrow NH_4NO_3 \quad (2)$$
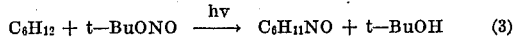
$$C_6H_{12} + t\text{—BuONO} \xrightarrow{h\nu} C_6H_{11}NO + t\text{—BuOH} \quad (3)$$
$$C_6H_{11}NO \xrightarrow[\substack{t\text{—BuOH} \\ NH_3}]{} C_6H_{10}=NOH \quad (4)$$

It will be understood that, in considering these equations, the cyclohexane, t-butyl alcohol and $N_2O_4$ are present together in the reaction mixture, that the alcohol and $N_2O_4$ react to form the t-butyl nitrite, that ammonia is added, and that the t-butyl alcohol and ammonia are present in excess. The alcohol dissolves in the cyclohexane. As shown by equation (1), the alcohol reacts with the $N_2O_4$ to form t-butyl nitrite and nitric acid. The nitric acid is then removed from the mixture by conversion to ammonium nitrate, according to equation (2), for the reason that it tends to give side products during photolysis. Under the influence of the radiation, the cyclohexane reacts with the nitrite to form nitrosocyclohexane, as in equation (3), and in the presence of the excess alcohol and excess ammonia, the nitroso compound rearranges to cyclohexanone oxime.

The invention contemplates the use of various cycloaliphatic compounds, particularly cycloalkanes having five to 12 carbon atoms in the ring portion and including cyclopentane, cyclohexane, cycloheptane, cyclooctane, cyclononane, cyclodecane, cycloundecane, and cyclododecane. Also suitable are alkyl-substituted cycloalkanes like methylcyclopentane, methylcyclohexane, ethylcyclopentane, ethylcyclohexane, etc.; cycloolefins like cyclopentene, cyclohexene, cycloheptene, cyclooctene, etc.; cycloalkyl esters like cyclohexylacetate, methylcyclohexylcarboxylate, etc.; halogenated cycloalkanes like chlorocyclohexane, tribromocyclohexane, etc.

The alkyl nitrite includes, besides t-butyl nitrite, nitrites wherein the alkyl group is methyl, ethyl, propyl, isopropyl, isobutyl, t-butyl, amyl, isoamyl, t-amyl, etc. These comprise a well-defined group of lower alkyl nitrites having one to five carbons in the alkyl group. The preferred nitrites are methyl nitrite and t-butyl nitrite.

The alkyl alcohol is one whose alkyl group preferably corresponds to that of the nitrite. Thus, suitable alcohols may have one to five carbons, such as methanol, ethanol, propanol, isopropanol, t-butanol, isobutanol, pentanol, etc. The group as a whole comprises a lower molecular weight alkanol.

The concentration of alkyl nitrite is low, being usually about 1 percent, weight or mole basis, of the cycloaliphatic compound, and ranging from about 0.001 or 0.01 up to 4 or 5 percent or even up to 10 percent. In other words, for every mole of cycloaliphatic compound there are 0.00001 to 0.1 moles of the nitrite present, and as is apparent, the cycloaliphatic compound is present in excess. As indicated, it is preferred to form the nitrite in situ from the alcohol and nitrogen dioxide, note equation (1), and this means that sufficient quantities of these two compounds should be present to form the described amount of nitrite, and furthermore, an additional quantity of the alcohol should be present to influence the described rearrangement reaction. According to this procedure, the alkyl moiety of the alcohol is desirably the same as that of the nitrite.

Besides nitrogen dioxide, other useful nitriting agents include nitrous acid, generated in situ.

Ammonia is a preferred material for neutralizing the nitric acid, note equation (2). As described, it is used in excess in order to provide an amount able to influence the rearrangement reaction. Generally, the excess ammonia may range from 10 percent to 500 or 600 percent, or more, of the amount necessary to neutralize the nitric acid. Besides ammonia, lower alkyl amines may be used, such as trimethyl amine, triethyl amine, dimethyl amine, diethyl amine, methyl amine, and ethyl amine. The amount of excess alkyl alcohol may be at least 50 to 100 percent of the amount of alkyl nitrite and may range upwardly to 2,000 or 3,000 percent thereof. It should be noted that these rearrangement or isomerization catalysts not only influence the conversion of the nitroso compound to the oxime but also they do not interfere with the free radical reaction between alkyl nitrite and cycloaliphatic compound.

Photolysis is preferably done at 70° to 80° C. and at a pressure sufficient to maintain the reactants in the liquid phase. Higher and lower temperatures are of use, ranging from 0° to 100° C., and also going up to the boiling point of the reaction mixture. Reaction times may generally extend from 1 minute to 1 hour (exposure time), but can be both longer and shorter. Batch or continuous operation is practicable.

Photolysis is preferably carried out with ultraviolet radiation, i.e., radiation whose wavelength may vary from 1,000 or 2,000 to 4,100 angstrom units. Any suitable source of light may be employed, such as a photochemical lamp of conventional power; if desired, it may be equipped to isolate a desired wavelength. Fluorescent lamps are useful, and also sunlight. Flash photolysis may be employed, or even a laser beam. Distances between the light source and the reaction mixture are of conventional magnitude, viz, 1 to 10 inches. Air is preferably excluded from the reactants.

To carry out the method, the alkyl alcohol is first dissolved in the cycloaliphatic compound, and nitrogen dioxide is introduced to the solution in an amount corresponding to the desired concentration of alkyl nitrite. As indicated, some unreacted alcohol is present. The temperature of the mixture is preferably kept at 70° to 80° C. The alcohol and the nitrogen dioxide react substantially quantitatively, in accordance with equation (1). After a period of a few seconds to several minutes to allow for completion of the reaction, ammonia gas is introduced to the mixture to convert the nitric acid coproduct to ammonium nitrate, note equation (2). This reaction is also quantitative, and as described, an excess of ammonia is introduced. The mixture may then be subjected to photolysis in a suitable vessel, in accordance with equation (3). During photolysis, the rearrangement reaction of equation (4) also begins to take place, and preferably this reaction is substantially completed by the time the photolysis is ended. If desired, the reaction mixture may be held at reaction temperature, i.e., 70° to 80° C., for a time sufficient to fully complete the rearrangement, usually a few minutes. The oxime product may be recovered by a physical process like distillation or absorption, or it may be precipitated from solution by a chemical agent like hydrogen chloride; if necessary, it may be purified in any suitable way.

If desired, prior to photolysis the ammonium nitrate may be removed from the mixture, as by subjecting the mixture to distillation, with or without vacuum, to distill away all components except the ammonium nitrate. It may also be removed by allowing it to settle out, and then centrifuging. As may be appreciated, it is a valuable compound and is worth recovering.

Referring to the photolysis reaction, the desired product may be present in the reaction mixture in three forms: monomeric nitrosocyclohexane, dimeric nitrosocyclohexane, and the isomeric cyclohexanone oxime. The nitroso compound is present primarily as the dimer; and both monomer and dimer convert to the oxime during photolysis. After rearrangement, yields of oxime may range from 60 or 70 to 80 or 90 mole percent, or more, of the alkyl nitrite or nitrogen dioxide that is utilized. The only byproduct identified was cyclohexanone, yield 3 percent based on nitrogen dioxide. Some nitrogen gas is produced during photolysis, amounting to 3 to 20 percent of the nitrogen dioxide.

The oxime may be converted to caprolactam by means of the Beckmann rearrangement, comprising heating the same to about 100° C. in the presence of a strong acid such as 96 percent sulfuric acid, chlorsulfonic acid, or oleum. The resulting solution of caprolactam is neutralized, as with ammonia, and the crude lactam separates as the upper layer. It is drawn off and purified in several stages, including the use of vacuum distillation, into fiber grade caprolactam suitable for making nylon 6.

Referring to the described process, it may be noted that the alkyl alcohol, which is used to form the alkyl nitrite and to influence the rearrangement reaction, may also function as a solvent, particularly for the ammonia.

Instead of forming the alkyl nitrite in situ, it is also feasible to take this compound from a commercial or other source, mix it with the cycloaliphatic compound, add the alkyl alcohol and ammonia, and then subject the mixture to photolysis. In this case, the alkyl moiety of the alcohol need not necessarily be the same as that of the nitrite although preferably it is. However, by forming the alkyl nitrite in situ, as described, advantage can be taken of the plural roles or functions of the alkyl alcohol and ammonia. Another advantage is one of economy; furthermore, some desirable nitrites are not commercially available. Also, one need not handle the alkyl nitrite per se, and this is advantageous because some are toxic, or gaseous, or easily decomposable as by sunlight.

Also of interest is the prospect of rearranging or isomerizing the nitrosocycloaliphatic compound, or the dimer of the same, obtained from any source, by heating it in the presence of an alkyl alcohol and ammonia. As illustrated below, in examples 15 and 16, these agents appear to act synergistically, to effect the isomerization and, in addition, to cause an enhancement of the ultimate yield of oxime.

A further prospect comprises starting with a straight chain aliphatic compound having five or six to 20 or 30 or more carbons like hexane, heptane, octane, etc., instead of a cycloaliphatic compound, and converting it to an oxime by the described method. A mixture of straight chain aliphatic compounds may be used as starting material. In this connection, the term "aliphatic" is to be understood as inclusive of straight or branched chain compounds and of cycloaliphatic compounds.

The invention may be illustrated by the following examples.

EXAMPLE 1

Cyclohexane and t-butyl alcohol were mixed and placed in a vessel. Nitrogen dioxide was introduced to the solution, and after allowing it to react with the alcohol to form t-butyl nitrite, ammonia gas was introduced. The mixture was then distilled, all components except ammonium nitrate being taken overhead and condensed in a Pyrex glass vessel. The resulting mixture contained, in mole percent, 88.3 percent cyclohexane, 0.88 percent t-butyl nitrite, 9.0 percent t-butyl alcohol, and 1.8 percent ammonia; it was subjected to photolysis, using 3,660 A. light, at various temperatures indicated in the following table:

| Expt. No. | Temp. °C. | % Dimer at end of photolysis | % Oxime at end of experiment | % $N_2$ |
| --- | --- | --- | --- | --- |
| 18 | 25° C. | 30 | 73* | 9.3 |
| 19 | 50 | 16 | 81* | 7.3 |
| 21 | 70 |  | 79 | 8.2 |
| 17 | 80 | 0 | 80 | 7.1 |
| 20 | 90 | 0 | 77 | 8.7 |

*heated for one-half hour at 80° C. to convert dimer to oxime.

Dimer and oxime concentrations were determined by, respectively, a Cary Spectrophotometer, Model 14, and an F & M Chromatograph, Model 810. Yields are based on the t-butyl nitrite. These data illustrate the good yields of oxime obtainable over the indicated temperature range using filtered light. In other experiments like the foregoing, but with only 0.58 percent ammonia, the yield of oxime was lower, ranging from 62 to 73 percent, at temperatures ranging from 80° to 90° C., respectively. Gas yield was 14 to 13 percent. In another series of experiments like those reported in the table, but using unfiltered light (wavelength 2,200 to 4,100 A. absorbed), and using a temperature of 80° C., the yield of oxime ranged from 64 to 80 percent, gas yield from 16 to 7.2 percent.

EXAMPLES 2–10

The procedure of example 1 was repeated, except for the following changes: the cyclohexane/t-butyl nitrite mole ratio was held constant at 100:1, and the t-butyl alcohol and ammonia concentrations, in mole percent, were varied as indicated in the following table. The temperature was 80° C., and the radiation used was light of 3,660 A.

| Expt. No. | t-Butyl Alcohol Mole % | Ammonia, Mole % | Oxime Yield % | Nitrogen Yield % |
| --- | --- | --- | --- | --- |
| 2–14 | 9 | 0.6 | 62 | 14 |
| 3–17 | 9 | 1.8 | 80 | 7 |
| 4–26 | 1.2 | 1.9 | 64 | 16 |
| 5–28 | 4.4 | 1.7 | 72 | 12 |
| 6–34 | 21 | 1.9 | 83 | 3.7 |
| 7–38 | 21 | 3.0 | 89 | 3.4 |
| 8–48 | 9 | 3.0 | 86 | 4.3 |
| 9–49 | 9 | 4.0 | 89 | 6.0 |
| 10–52 | 21 | 4.0 | 90 | 3.1 |

As may be seen, the oxime yield increases from 64 to 90 percent with increasing alcohol concentration over the range of 1.2 to 21 mole percent; and it similarly increases with increasing ammonia concentration over the range of 0.6 to 4.0 mole percent. Oxime concentrations were determined as in example 1; the nitrogen yield was considered as all nitrogen. Ammonia concentration is based on mole percent of the total moles of components in the reaction mixture. It may be noted that a concentration of 0.6 mole percent ammonia corresponds to an excess of about 70 percent of the ammonia necessary to neutralize the nitric acid.

EXAMPLES 11-12

No. 3-17 of the foregoing table was repeated, except that the cyclohexane/t-butyl nitrite mole ratio was 50:1. The oxime yield was 70 percent and the nitrogen yield 9 percent. Similarly, No. 7-38 was repeated with a cyclohexane/t-butyl nitrite mole ratio of 50:1, giving an oxime yield of 81 percent and a nitrogen yield of 5.6 percent.

EXAMPLE 13

Methyl nitrite was used in place of t-butyl nitrite. Thus a mixture was prepared comprising methyl alcohol 12 mole percent, ammonia 0.575 mole percent, and cyclohexane/methyl nitrite mole ratio of 97:1, and this was irradiated with light of 3,660 A. at 80° C., giving an oxime yield of 61 percent and a nitrogen yield of 11 percent.

EXAMPLE 14

In another experiment with unfiltered light (wavelength of 2,200 to 4,100 A.), a mixture of t-butyl alcohol 21 mole percent, ammonia 3 mole percent, and cyclohexane/t-butyl nitrite mole ratio of 100:1 was irradiated at 80° C. for 19 minutes, giving an oxime yield of 82 percent and a nitrogen yield of 9.8 percent.

EXAMPLE 15

A 0.6 mole percent solution of dimeric synthetic nitrosocyclohexane in cyclohexane was divided into three equal parts; to one there was added 12 mole percent methanol, to a second 0.6 mole percent ammonia, and to the third 12 mole percent methanol, plus 0.6 mole percent ammonia. The solutions were heated at 80° C. and maintained at such temperature in order to bring about rearrangement of the dimer to the oxime. The course of the reaction was followed by periodically reading the optical density (O.D.) of each solution at 3,500 A. in a Cary Spectrophotometer. (As dimer is converted to oxime, the O.D. decreases). The data follows:

| Solution 1 (methanol) | | Solution 2 (ammonia) | | Solution 3 (methanol plus ammonia) | |
|---|---|---|---|---|---|
| Time, hours | O. D. | Time, hours | O. D. | Time, hours | O. D. |
| 0 | 1.423 | 0 | 1.830 | 0 | 1.350 |
| 1 | 1.400 | 1 | 1.820 | 1 | 0.083 |
| 5 | 1.330 | 5 | 1.740 | 2 | .005 |
| 21 | 0.930 | 23 | 0.755 | | |
| 28 | .736 | 29 | .496 | | |
| 44 | .295 | 35 | .280 | | |
| 50 | .217 | (Yellow color developing) | | | |
| 56 | .118 | | | | |
| 73 | .050 | | | | |

The final solutions were analyzed for oxime and showed the expected concentrations, corresponding to the original dimer concentrations. It is apparent that in the presence of the ammonia and alcohol, the conversion of dimer to oxime is far more rapid than in the presence of the ammonia alone or the alcohol alone.

EXAMPLE 16

To illustrate further the effect of the joint presence of the ammonia and alcohol, the following series of experiments were carried out. Four mixtures were prepared, identified in the table below as Nos. 9, 10, 11, and 12, in each of which the cyclohexane/t-butyl nitrite mole ratio was 100:1, and in which the concentrations (reported as mole percent of the total reaction mixture) of t-butyl alcohol and ammonia were varied as shown. Each mixture was subjected to photolysis at a temperature of 80° C. with radiation of 3,660 A. The following data resulted:

| Number | t-Butyl alcohol, mole percent | Ammonia, mole percent | Photolysis time of nitrite, minutes | Percent dimer at end of photolysis | Additional heating at 80° C., hours | Oxime yield, percent | $N_2$ yield, percent |
|---|---|---|---|---|---|---|---|
| 9 | 0 | 0 | 90 | 27.6 | 18 | 45 | 16.5 |
| 10 | 10 | 0 | 75 | 22.8 | 17 | 65 | 11.3 |
| 11 | 0 | 2.1 | 75 | 23.0 | 113 | 57 | 17.1 |
| 12 | 10 | 1.8 | 70 | None | 0 | 75 | 8.2 |

Photolysis was stopped when the t-butyl nitrite, in each case, was photolyzed; and it will be seen that in No. 12 the t-butyl nitrite was photolyzed in the shortest time. The dimer content of No. 9 (no added agents) was highest (based on initial amount of nitrite) and the dimer in No. 10 (alcohol added) and No. 11 (ammonia added) was somewhat lower showing a mild isomerization effect. In No. 12, containing both alcohol and ammonia, there was no dimer present at the end of the photolysis step; the dimer was all isomerized to oxime during the photolysis, clearly demonstrating the synergistic action of the two agents. The solutions from Nos. 9, 10, and 11 were subjected to further heating, for the times noted in the table, at 80° C. in order to convert dimer to oxime. Oxime yields, based on the initial amount of t-butyl nitrite, are noted, and it is evident that the highest yield was obtained in run No. 12. Nitrogen yield, based on the initial amount of t-butyl nitrite, is lowest for No. 12.

EXAMPLE 17

In another experiment, n-hexane was used in place of cyclohexane. A mixture was prepared comprising 24.6 mole percent t-butyl alcohol, 3.06 mole percent ammonia, and having a n-hexane: t-butyl nitrite mole ratio of 100:1, and this was irradiated at 80° C. for 85 minutes with light of 3,660 A. No dimer was detected. Two oximes were obtained: 3-hexanone oxime,

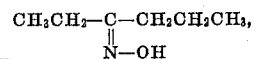

yield 31 percent, and 2-hexanone oxime,

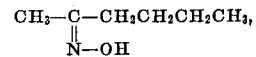

yield 47 percent, both yields being based on the t-butyl nitrite.

It will be understood that the invention is capable of obvious variations without departing from its scope.

In the light of the foregoing description, the following is claimed.

1. Process of forming a ketoxime of a cycloaliphatic compound in good yield by means of a photochemical reaction between a cycloaliphatic compound having five to 12 carbon atoms in the ring portion thereof and an alkyl nitrite having one to five carbon atoms, wherein the molar amount of cycloaliphatic compound exceeds that of the alkyl nitrite, comprising forming a solution of an alkyl alcohol in said cycloaliphatic compound, the alkyl moiety of said alcohol corresponding to that of said nitrite, adding nitrogen dioxide to said solution to react with a part of said alcohol to form said nitrite and also to form nitric acid as a coproduct, a part of said alcohol remaining as excess in the resulting mixture, adding excess ammonia to said mixture to react with the nitric acid to form ammonium nitrate, the excess ammonia remaining in said mixture, subjecting said mixture to photolysis by exposing the same to radiation of a wavelength of 1,000 to 4,100 angstrom units, thereby to react the cycloaliphatic compound with the alkyl nitrite to form a nitrosocycloaliphatic compound, reacting the latter compound in the presence of said excess alcohol and said excess ammonia to form said ketoxime, and forming said ketoxime in a yield of at least 60 percent, based on the amount of nitrogen dioxide used.

2. Process of claim 1 wherein the cycloaliphatic compound is cyclohexane, the alkyl alcohol is t-butyl alcohol, the alkyl nitrite is t-butyl nitrite, the nitrosocycloaliphatic compound is nitrosocyclohexane, and the ketoxime is cyclohexanone oxime.

3. Process of claim 1 wherein the cycloaliphatic compound is cyclohexane, the alkyl alcohol is methyl alcohol, the alkyl nitrite is methyl nitrite, the nitrosocycloaliphatic compound is nitrosocyclohexane, and the ketoxime is cyclohexanone oxime.

4. Process of claim 1 wherein the concentration of alkyl nitrite is 0.00001 to 0.1 mole per mole of cycloaliphatic compound.

5. Process of claim 1 wherein said ammonium nitrate is removed from said mixture before subjecting the latter to photolysis.

6. Process of forming a ketoxime of a cycloaliphatic compound in good yield by means of a photochemical reaction between a cycloaliphatic compound having five to 12 carbons in the ring portion thereof and an alkyl nitrite having one to five carbons in the alkyl moiety comprising adding to a mixture of said reactants an alkyl alcohol and ammonia, the alkyl moiety of said alcohol corresponding to that of said nitrite, photolyzing said mixture by exposing the same to radiation of a wavelength of 1,000 to 4,100 angstrom units to form a nitrosocycloaliphatic compound, and subjecting the latter compound to rearrangement in the presence of said alkyl alcohol and ammonia to form said ketoxime.

7. Process of forming a nitroso compound and an oxime comprising mixing a cycloaliphatic compound having five to 12 carbons in the ring portion thereof and an alkyl nitrite having one to five carbons in the alkyl moiety, adding to the mixture an alkyl alcohol and ammonia, the alkyl moiety of said alcohol corresponding to that of said nitrite, exposing the mixture to radiation of a wavelength of 1,000 to 4,100 angstrom units, and thereby forming the corresponding nitroso compound and oxime of said cycloaliphatic compound.

8. Process of reacting a nitrosoaliphatic compound to form the corresponding ketoxime which comprises heating the former to a temperature in the range of about 0° to 100° C. in the presence of an alkyl alcohol and a basic nitrogen-containing compound selected from ammonia and a lower alkyl amine, thereby to rearrange said nitroso compound to form said ketoxime.

9. Process of claim 8 wherein said nitroso compound is a nitrosocycloaliphatic compound having five to 12 carbon atoms in the ring portion thereof.

10. Process of claim 8 wherein said nitroso compound is a nitrosoalkane.

11. Process of claim 8 wherein said nitroso compound is a nitrosocycloalkane having five to 12 carbon atoms in the ring portion thereof.

12. Process of claim 8 wherein said nitroso compound is the dimer of a nitrosocycloaliphatic compound having five to 12 carbon atoms in the ring portion thereof.

13. Process of claim 12 wherein said dimer is that of nitrosocyclohexane.

14. Process of forming an oxime of an aliphatic compound comprising reacting said aliphatic compound with an alkyl nitrite having one to five carbon atoms in the presence of an alkyl alcohol and a basic nitrogen-containing compound selected from ammonia and a lower alkyl amine by exposing the mixture to radiation of a wavelength of 1,000 to 4,100 angstrom units to form a nitrosoaliphatic compound, and subjecting the latter compound to rearrangement in the presence of said alkyl alcohol and said basic nitrogen-containing compound to form said oxime.

15. Process of claim 14 wherein said alkyl nitrite is formed in situ by reaction between said alkyl alcohol and nitrogen dioxide, the latter being added to said mixture prior to photolysis.

16. Process of claim 14 wherein said alkyl nitrite is added per se.

* * * * *